(12) United States Patent
Knittel

(10) Patent No.: US 11,106,947 B2
(45) Date of Patent: Aug. 31, 2021

(54) SYSTEM AND METHOD OF CLASSIFYING AN ACTION OR EVENT

(71) Applicant: CANON KABUSHIKI KAISHA, Tokyo (JP)

(72) Inventor: Anthony Knittel, Maroubra (AU)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 15/840,988

(22) Filed: Dec. 13, 2017

(65) Prior Publication Data

US 2019/0180149 A1 Jun. 13, 2019

(51) Int. Cl.
| | |
|---|---|
| *G06K 9/00* | (2006.01) |
| *G06K 9/62* | (2006.01) |
| *G06N 3/04* | (2006.01) |
| *G06N 3/08* | (2006.01) |
| *G06T 7/246* | (2017.01) |

(52) U.S. Cl.
CPC ....... *G06K 9/6267* (2013.01); *G06K 9/00335* (2013.01); *G06K 9/00718* (2013.01); *G06N 3/04* (2013.01); *G06N 3/08* (2013.01); *G06T 7/246* (2017.01); *G06K 2009/00738* (2013.01); *G06T 2207/10016* (2013.01)

(58) Field of Classification Search
CPC ............. G06K 9/6267; G06K 9/00335; G06K 9/00718; G06K 2009/00738; G06T 7/246; G06T 2207/10016; G06N 3/08; G06N 3/04
See application file for complete search history.

(56) References Cited

U.S. PATENT DOCUMENTS

| | | | | |
|---|---|---|---|---|
| 5,067,095 | A | * | 11/1991 | Peterson .................. G06N 3/04 706/33 |
| 6,227,842 | B1 | | 5/2001 | Lemelson |
| 6,535,620 | B2 | * | 3/2003 | Wildes ............... G06K 9/00335 382/107 |
| 6,571,228 | B1 | | 5/2003 | Wang |

(Continued)

OTHER PUBLICATIONS

Hochreiter & Schmidhuber, Long Short Term Memory, Technische Universitat München, 1997.

(Continued)

*Primary Examiner* — Shefali D Goradia
(74) *Attorney, Agent, or Firm* — Canon U.S.A, , Inc, IP Division

(57) ABSTRACT

A method of classifying an action or event using an artificial neural network. The method comprises obtaining a first and a second plurality of feature responses, corresponding to point data in a first channel and a second channel respectively. Each of the first and second plurality of feature responses have associated temporal and spatial position values, the first and second plurality of feature responses relating to a plurality of objects. The method also comprises generating a third plurality of feature responses based on one of the first plurality of feature responses and one of the second plurality of feature responses, and a weighted combination of associated temporal and spatial position values of the corresponding one of the first and second plurality of feature responses; and classifying an action or event relating to the objects using the artificial neural network based on the third plurality of feature responses.

16 Claims, 12 Drawing Sheets

(56) References Cited

U.S. PATENT DOCUMENTS

| | | | |
|---|---|---|---|
| 2003/0208289 A1* | 11/2003 | Ben-Arie | G06F 3/011 700/61 |
| 2016/0321559 A1 | 11/2016 | Rose | |
| 2017/0238055 A1* | 8/2017 | Chang | A63F 13/60 725/19 |
| 2019/0180090 A1* | 6/2019 | Jiang | G06T 7/246 |

OTHER PUBLICATIONS

Yu et al, On Compressing Deep Models by Low Rank and Sparse Decomposition, CVPR 2017, University of Sydney, University of Illinois, Jul. 2017.

Qi et al, PointNet: Deep Learning on Point Sets for 3D Classification and Segmentation, CVPR 2017, Stanford University, Apr. 10, 2017.

Tran et al., "Learning spatiotemporal features with 3d convolutional networks", ICCV 2015.

* cited by examiner

SYSTEM AND METHOD OF CLASSIFYING AN ACTION OR EVENT

TECHNICAL FIELD

The present invention relates to recognition of actions, events and objects, for example the recognition of human actions and events in sports, from video and other data such as tracking of player and ball positions. In particular the present invention describes a method for encoding features in an artificial neural network based on point data that includes a response value and values representing position in space and time.

BACKGROUND

Recognition of human actions and events is typically performed using video data containing the actions. In addition, further data such as tracking information of the position of people and objects of interest, for example players and a ball in a game space may also be used to detect actions. Tracking information may be determined from video data, annotated by hand or collected by other means such as with a tracking recording system.

Using an example of a ball sport, tracking data typically encodes the positions of players and objects as a set of coordinate values within a scene (such as a playing field), corresponding to positions at various points in time. Existing methods for classifying actions and events include artificial neural network methods. Existing artificial neural network methods are designed for operating on dense data encoded in an array or tensor, such as an array where the coordinates of the array encode position information. In typical artificial neural network methods, related information from nearby positions in the array can be processed together using convolution operators, and the convolution operator can be applied to various positions.

Typical artificial neural network methods do not operate effectively for classifying actions or events using point data, where the position value is encoded as a numeric value. Classification of actions from point data, such as from tracking data, is not effectively addressed by existing methods. Existing methods that operate on point data are designed for operating on a set of points in a 2 or 3 dimensional space representing a physical structure, and are not readily applicable for use with point data. Typical artificial neural network methods have design problems, computational and memory problems and show limited accuracy for operating with point data.

Recognition of actions and events from video is typically performed by encoding sections of the video data in a processing system such as a Graphics Processing Unit (GPU). Common methods involve storing the video on a GPU, and processing the video data using a convolutional neural network to produce a classification of the action present in the video. A limitation of the approach is that the available memory of the GPU is limited. As a result the size of the video that can be recorded, in terms of the height and width of each frame, or the number of frames that can be stored is limited. In addition, limited memory is available for processing using a convolutional neural network. A convolutional neural network requires memory for encoding the feature responses of the network, the feature responses each stored as an array or tensor. The memory requirements for storing and processing the video and feature response values result in limitations in the size of the video that can be processed for detecting actions. Some actions and events take place over long periods of time, such as hundreds of frames. Existing methods are only able to store and operate with approximately 20 video frames in GPU memory, and as a result are not sufficient for recognising actions and events that occur over longer periods of time.

SUMMARY

It is an object of the present invention to substantially overcome, or at least ameliorate, at least one disadvantage of present arrangements.

One aspect of the present disclosure provides a method of classifying an action or event using an artificial neural network, the method comprising: obtaining a first plurality of feature responses corresponding to point data in a first channel and a second plurality of feature responses corresponding to point data in a second channel, each of the first and second plurality of feature responses having associated temporal and spatial position values, the first and second plurality of feature responses relating to a plurality of objects; generating, using the artificial neural network, a third plurality of feature responses, each of the third plurality of feature responses being generated based on one of the first plurality of feature responses from the first channel and one of the second plurality of feature responses from the second channel, and a weighted combination of associated temporal and spatial position values of the corresponding one of the received first and second plurality of feature responses; and classifying an action or event relating to the plurality of objects using the artificial neural network based on the generated third plurality of feature responses.

According to another aspect, each of the first and second channels reflects a semantic property of the plurality of objects.

According to another aspect, the first and second plurality of feature responses comprise tracking information associated with the plurality of objects.

According to another aspect, the first and second plurality of feature responses are determined from video data capturing a scene including the plurality of objects.

According to another aspect, the artificial neural network comprises a convolutional neural network, the method further comprising using the convolutional neural network to generate the first and second plurality of feature responses from video data of the plurality of objects.

According to another aspect, the artificial neural network further comprises a dense to sparse layer, and output of the convolutional neural network is provided to the dense to spare layer to generate the first and second plurality of feature responses.

According to another aspect, the third plurality of feature responses includes associated spatial and temporal position information of the plurality of objects in the scene.

According to another aspect, the associated spatial and temporal position information comprises spatial and temporal position values associated with one of the first and second channels.

According to another aspect, the associated spatial and temporal position information comprises an average of spatial and temporal position values associated with the first and second channels.

According to another aspect, the spatial and temporal position information relates to coordinates in a scene determined from tracking data.

According to another aspect, the spatial and temporal position information relates pixel positions corresponding to the plurality of objects in a video.

According to another aspect, the weighted combination of associated temporal and spatial position values of the corresponding one of the received first and second plurality of feature responses is determined using differences between the spatial and temporal position values of the first and second plurality of feature responses.

According to another aspect, the third plurality of feature responses is generated based on one of the first plurality of feature responses from the first channel and one of the second plurality of feature responses from the second channel, and a response of an attenuation function using the weighted combination of the associated temporal and spatial position values of the corresponding one of the received first and second plurality of feature responses.

Another aspect of the present disclosure provides a method of classifying an action or event using an artificial neural network, the method comprising: obtaining a first plurality of feature responses corresponding to point data in a first channel and a second plurality of feature responses corresponding to point data in a second channel, each of the first and second plurality of feature responses having associated temporal and spatial position values, the first and second plurality of feature responses relating to a plurality of objects; generating, using the artificial neural network, a third plurality of feature responses, each of the third plurality of feature responses being generated based on one of the first plurality of feature responses from the first channel and one of the second plurality of feature responses from the second channel, and a response of an attenuation function using a weighted combination of the associated temporal and spatial position values of the corresponding one of the received first and second plurality of feature responses; and classifying an action or event relating to the plurality of objects using the artificial neural network based on the generated third plurality of feature responses.

Another aspect of the present disclosure provides a non-transitory computer readable storage medium storing program instructions for classifying an action or event using an artificial neural network, the program comprising:

code for obtaining a first plurality of feature responses corresponding to point data in a first channel and a second plurality of feature responses corresponding to point data in a second channel, each of the first and second plurality of feature responses having associated temporal and spatial position values, the first and second plurality of feature responses relating to a plurality of objects; code for generating, using the artificial neural network, a third plurality of feature responses, each of the third plurality of feature responses being generated based on one of the first plurality of feature responses from the first channel and one of the second plurality of feature responses from the second channel, and a weighted combination of associated temporal and spatial position values of the corresponding one of the received first and second plurality of feature responses; and code for classifying an action or event relating to the plurality of objects using the artificial neural network based on the generated third plurality of feature responses.

Another aspect of the present disclosure provides apparatus for classifying an action or event, comprising: a processor; and a memory device storing a software program for directing the processor to perform a method comprising the steps of: obtaining a first plurality of feature responses corresponding to point data in a first channel and a second plurality of feature responses corresponding to point data in a second channel, each of the first and second plurality of feature responses having associated temporal and spatial position values, the first and second plurality of feature responses relating to a plurality of objects; generating, using an artificial neural network, a third plurality of feature responses, each of the third plurality of feature responses being generated based on one of the first plurality of feature responses from the first channel and one of the second plurality of feature responses from the second channel, and a weighted combination of associated temporal and spatial position values of the corresponding one of the received first and second plurality of feature responses; and classifying an action or event relating to the plurality of objects using the artificial neural network based on the generated third plurality of feature responses.

Another aspect of the present disclosure provides a system comprising: a processor; and a memory device storing a software program for directing the processor to perform a method comprising the steps of: obtaining a first plurality of feature responses corresponding to point data in a first channel and a second plurality of feature responses corresponding to point data in a second channel, each of the first and second plurality of feature responses having associated temporal and spatial position values, the first and second plurality of feature responses relating to a plurality of objects; generating, using an artificial neural network, a third plurality of feature responses, each of the third plurality of feature responses being generated based on one of the first plurality of feature responses from the first channel and one of the second plurality of feature responses from the second channel, and a weighted combination of associated temporal and spatial position values of the corresponding one of the received first and second plurality of feature responses; and classifying an action or event relating to the plurality of objects using the artificial neural network based on the generated third plurality of feature responses.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

A method and system for classifying data is described below.

The present arrangements described relate to a method for classification of video and other point data. The methods described relate to allowing reduced memory usage for classification of video and related data, and effective classification using data encoded as point information. Point data is data where position values are encoded as numeric values.

Figure 9:
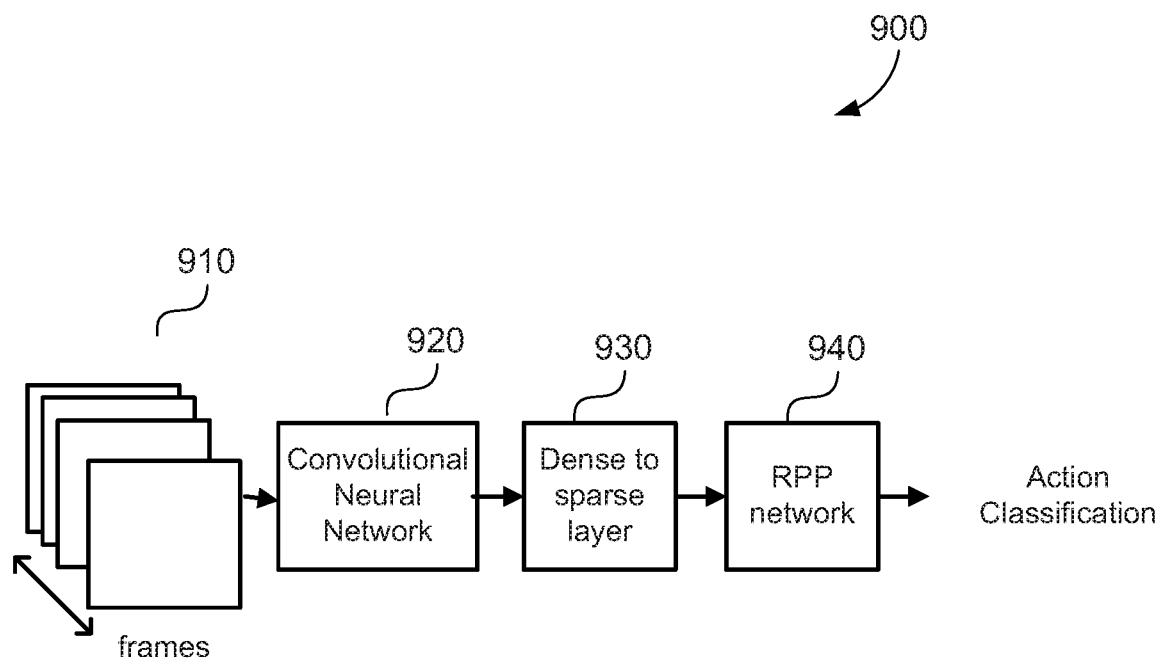
FIG. 9 shows a schematic block diagram illustrating an artificial neural network consisting of several layers, including an Relative Point Position network.

Classification of data involves applying a label or output for an instance of data, for example by applying the label for an action present in a video sequence. A set of instances of training data and labels are used to train a classification system such as an artificial neural network. The artificial neural network is trained to be able to perform classification of instances not present in the training data, as a result of learning a relationship between data and labels for the instances present in the training set. An example of an artificial neural network 900 is shown in FIG. 9.

An artificial neural network forms a classification system consisting of several layers, where each layer typically consists of a network of nodes and edges. Edges are also referred to as connections, and connect nodes of one layer to nodes of the next layer. Each edge is weighted, having an associated real-value number or weight representing a strength of a connection between corresponding nodes. When the artificial neural network is trained for classification, each node is associated with a real-valued number representing an activation value of the node. The activation value is a response produced by the node based on a value of inputs to the node and the connection strengths (edge weights). In addition to classification, artificial neural networks are used for other purposes such as reconstructing data provided to the artificial neural network as input.

To perform classification of an instance of data, the instance is provided as input data values to the artificial neural network. The input data values are used as activation values for each of the input nodes. Activation of nodes in each layer of the artificial neural network is performed by propagation of values from the input nodes to nodes in higher value layers of the artificial neural network. The propagation of values from the input nodes to nodes in higher value layers is performed according to the strength of the connections between the nodes, and other functions defined by the artificial neural network, such as the activation function. Possible activation functions include, but are not limited to, a sigmoid function, a hyperbolic tangent function, and a rectified linear function. For each instance of the training data, the activation value of output nodes of the artificial neural network is determined. The activation value of the output nodes is compared with a corresponding training target. The relationship between the activation value of the output nodes and the corresponding training target is referred to as the loss value. The loss value is used to modify the connections of the artificial neural network. In this manner, the artificial neural network is trained to recognise the relationship between the input data values and the target labels. The loss value may, for example, relate to a difference, a sum or a negative logarithm likelihood function between the activation value of the output nodes and the corresponding training target. The training target may be represented by a concept that is recognisable by humans, for example "kick a ball", and is encoded using a numeric value such as three (3). In the artificial neural network, each target class corresponds to an output node of the neural network.

Classification systems, such as artificial neural network classifiers, can be used to identify actions performed by humans in video. Artificial neural network classification systems can be used to identify the class of an action occurring in a section of video from a set of possible classes, known as a classification task. Artificial neural network classification systems can also be used to perform temporal detection of actions, to identify the start and end frames of an action, and the class of action being performed. Artificial neural network classification systems can also be used to perform spatial detection of actions, to identify the spatial region on each frame of the video that the action is taking place, and to perform segmentation of actions, which involves identifying which pixels, or detailed spatial regions of the video, correspond to the action taking place.

Existing methods such as artificial neural network classifier systems operating on GPU hardware, are able to perform classification on video segments of limited spatial size and limited temporal length, for example 200×200 spatial pixels and 20 frames. Existing methods are unable to be trained on longer durations with the same resolution, for example 100 or 1000 frames, or longer. It is an advantage to be able to train the entire artificial neural network using large input regions, such that nodes in the first layers of the artificial neural network are trained using the context of 100 or 1000 frames or longer. Training using large input regions provides an advantage by allowing nodes in the first layers of the artificial neural network to be trained using the context of a long, complex action that occurs over hundreds or thousands of frames or longer. Existing methods are not able to perform training with relatively large spatial sizes and temporal durations.

Existing methods operate using video input, and using intermediate feature responses. The spatial position of the data is represented using an array index of the data. For example, input or feature responses corresponding with a centre of a field of view, are represented in the central indexes of the data array. Existing methods have not shown the ability to perform training using data where the spatial position is encoded as a numeric value rather than an array position, and where training data represents a number of semantic properties. Semantic properties can for example be represented as feature channels representing visual properties, actions taking place in video, or tracking data of player positions on a sports field.

Figure 10A:
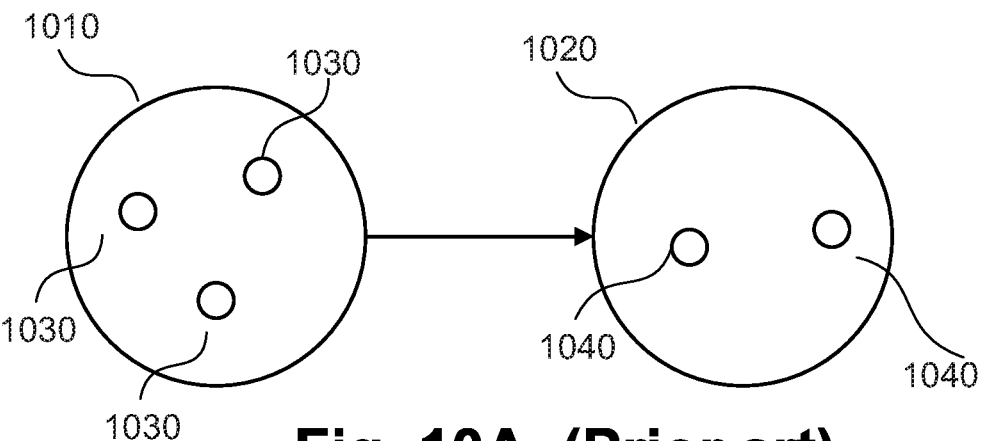
FIGS. 10A and 10B provide a comparison of known methods and the arrangements described.
Figure 10B:
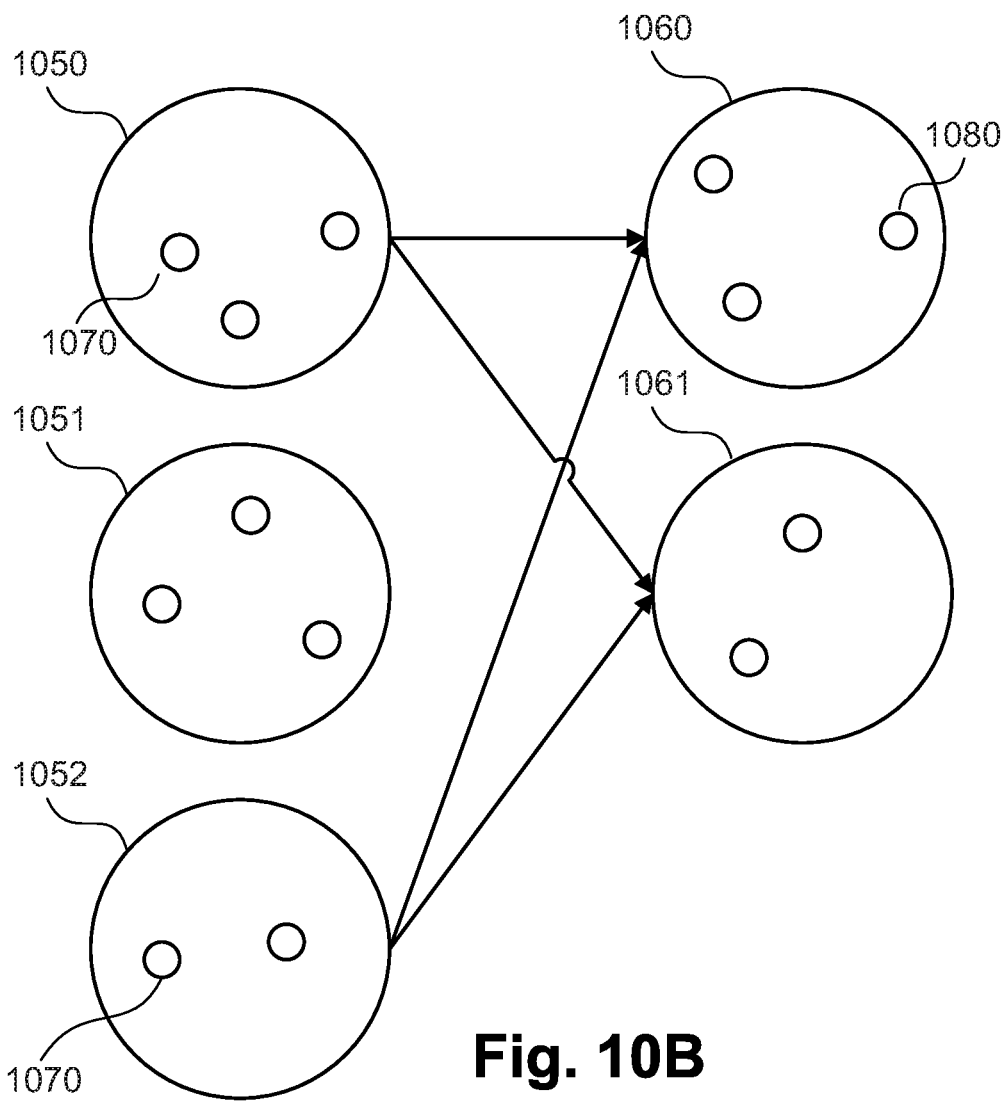

FIGS. 10A and 10B illustrate differences between existing methods that operate using point data and the arrangements described herein. Existing methods, as shown in FIG. 10A, receive input as an unordered set 1010 of points 1030. Each of the points 1030 contains values such as position values in 2 or 3 dimensions, and other values as colour or normal values associated with the point. A second set of features 1020 is produced from the input set 1010. The set of features 1020 contains a number of feature responses 1040. Each of the feature responses 1040 is determined based on all of the points 1030 in the input set 1010.

In an example of the methods described herein, as shown in FIG. 10B, input is received as a plurality of channels 1050, 1051, 1052. Each of the channels 1050 to 1052 contains an unordered set of points, such as points 1070. A second plurality of feature channels 1060, 1061 is produced. Each of the channels 1061 and 1062 comprises an unordered set of feature responses, such as a feature response 1080. Each of the feature channels 1060 and 1062 is connected to two or more of the input channels 1050, 1051, 1052. Each feature response, such as the feature response 1080, is determined from two or more of the input responses, for example from input responses 1070. Each of the input responses 1070 is a member of an input channel 1050, 1051, 1052 connected to the feature channel 1060 of the feature response 1080. Each of the input responses 1070 resulting in the output response 1080 is typically from a different channel to the other input responses.

Each of the channels 1050, 1051 and 1052 represents a different semantic property of objects such as one of a visual property, an action taking place, or tracking of a position of a player on a sports field. Channels can be provided as input data to the system, for example to encode individual players in tracking data, or to represent visual properties such as different colours. Channels can also be determined from previous layers of the learning system, including from the methods described herein, where the channels represent features learned by the artificial learning system. The learned channels may each correspond with visual properties such as objects, body parts or actions taking place in the input data.

The arrangements described address problems relating to memory usage for performing classification of actions in video using an artificial neural network. The arrangements described also address problems relating encoding spatial information using numeric values rather than array indexes for performing classification of actions in video using an artificial neural network, Encoding data using the position of an object as a value, rather than an array index corresponding to the object, allows data to be encoded in a sparse manner. In sparsely encoded data, the number of recorded values is substantially less than the product of the dimensions of the input array, reducing the amount of memory used compared to a dense representation in an array. Encoding the data using position values also allows relatively high resolution position values without requiring a relatively large array to store the information, allowing high precision of position information with lower memory than if the information was encoded in an array.

The arrangements described can operate using data represented as point data. In point data, positions are encoded as numeric values, representing a number of semantic properties such as the positions of different players on a sports field, or a number of visual features present in a sparse representation of video input.

Figure 5A:
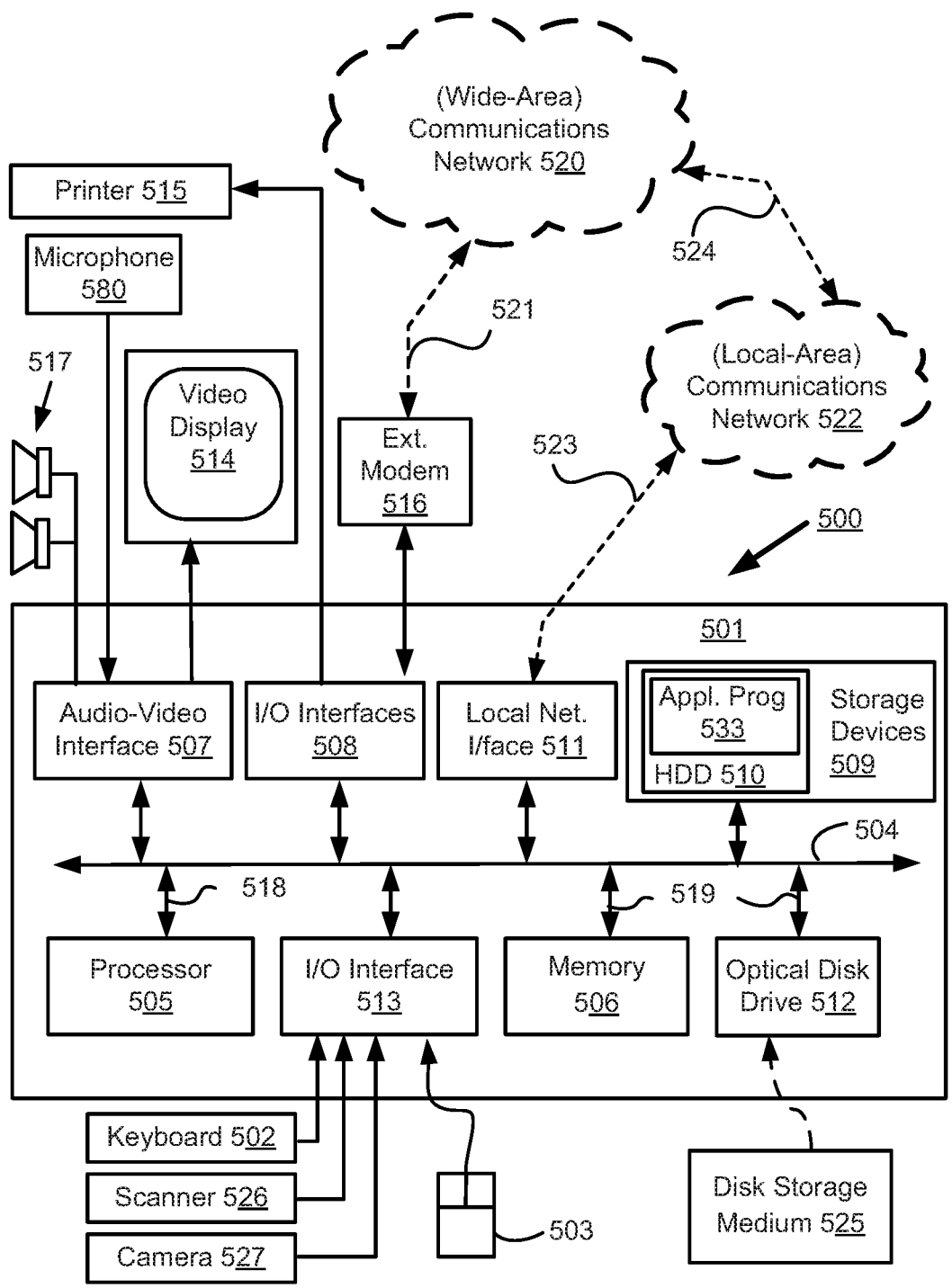
FIGS. 5A and 5B form a schematic block diagram of a general purpose computer system upon which arrangements described can be practiced.
Figure 5B:
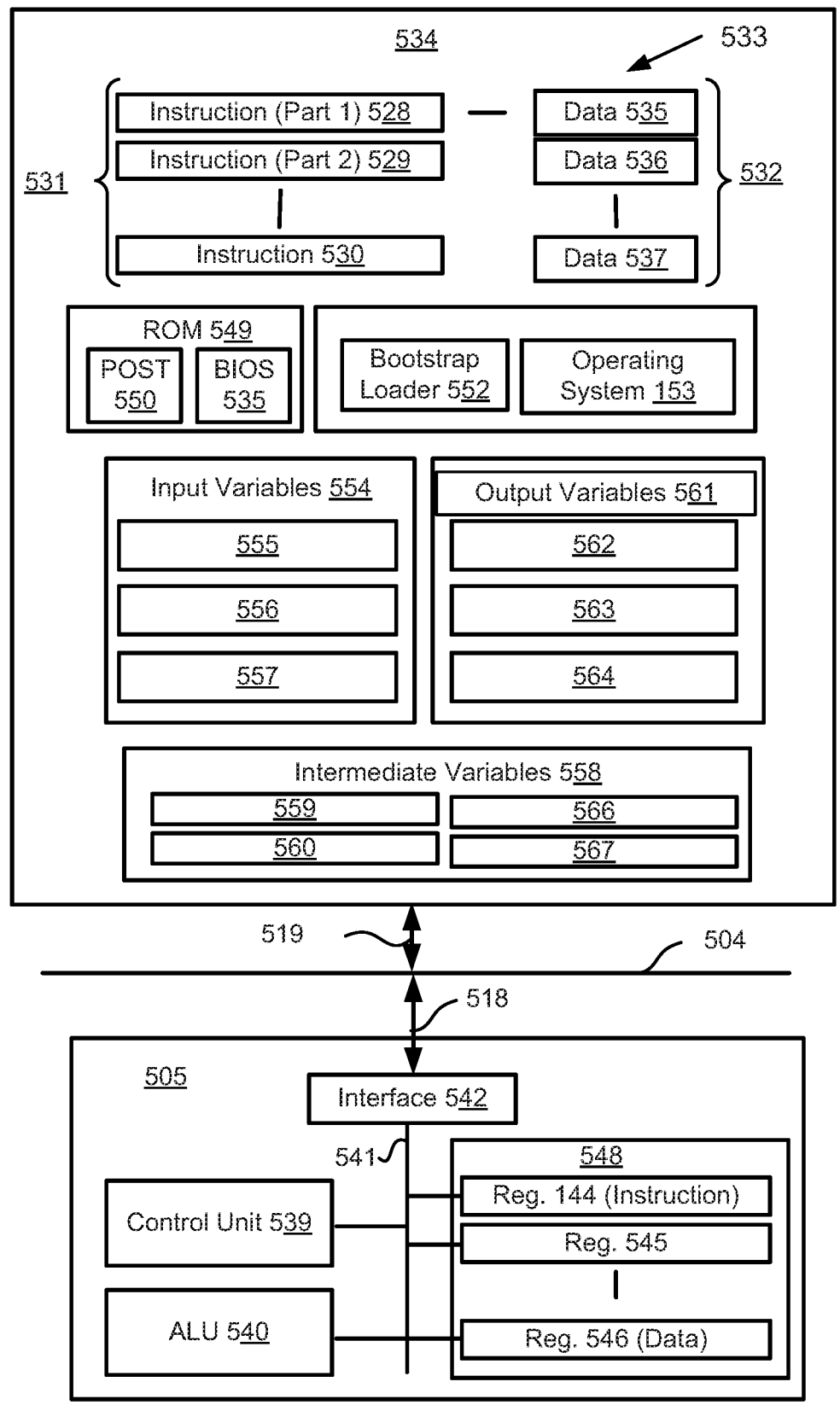

The arrangements described use an artificial neural network implemented on a computing d FIGS. 5A and 5B depict a general-purpose computer system 500, upon which the various arrangements described can be practiced.

As seen in FIG. 5A, the computer system 500 includes: a computer module 501; input devices such as a keyboard 502, a mouse pointer device 503, a scanner 526, a camera 527, and a microphone 580; and output devices including a printer 515, a display device 514 and loudspeakers 517. An external Modulator-Demodulator (Modem) transceiver device 516 may be used by the computer module 501 for communicating to and from a communications network 520 via a connection 521. The communications network 520 may be a wide-area network (WAN), such as the Internet, a cellular telecommunications network, or a private WAN. Where the connection 521 is a telephone line, the modem 516 may be a traditional "dial-up" modem. Alternatively, where the connection 521 is a high capacity (e.g., cable) connection, the modem 516 may be a broadband modem. A wireless modem may also be used for wireless connection to the communications network 520.

The computer module 501 typically includes at least one processor unit 505, and a memory unit 506. For example, the memory unit 506 may have semiconductor random access memory (RAM) and semiconductor read only memory (ROM). The computer module 501 also includes an number of input/output (I/O) interfaces including: an audio-video interface 507 that couples to the video display 514, loudspeakers 517 and microphone 580; an I/O interface 513 that couples to the keyboard 502, mouse 503, scanner 526, camera 527 and optionally a joystick or other human interface device (not illustrated); and an interface 508 for the external modem 516 and printer 515. In some implementations, the modem 516 may be incorporated within the computer module 501, for example within the interface 508. The computer module 501 also has a local network interface 511, which permits coupling of the computer system 500 via a connection 523 to a local-area communications network 522, known as a Local Area Network (LAN). As illustrated in FIG. 5A, the local communications network 522 may also couple to the wide network 520 via a connection 524, which would typically include a so-called "firewall" device or device of similar functionality. The local network interface 511 may comprise an Ethernet circuit card, a Bluetooth® wireless arrangement or an IEEE 802.11 wireless arrangement; however, numerous other types of interfaces may be practiced for the interface 511.

The I/O interfaces 508 and 513 may afford either or both of serial and parallel connectivity, the former typically being implemented according to the Universal Serial Bus (USB) standards and having corresponding USB connectors (not illustrated). Storage devices 509 are provided and typically include a hard disk drive (HDD) 510. Other storage devices such as a floppy disk drive and a magnetic tape drive (not illustrated) may also be used. An optical disk drive 512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 500.

The components 505 to 513 of the computer module 501 typically communicate via an interconnected bus 504 and in a manner that results in a conventional mode of operation of the computer system 500 known to those in the relevant art. For example, the processor 505 is coupled to the system bus 504 using a connection 518. Likewise, the memory 506 and optical disk drive 512 are coupled to the system bus 504 by connections 519. Examples of computers on which the described arrangements can be practised include IBM-PC's and compatibles, Sun Sparcstations, Apple Mac™ or like computer systems.

The method of classifying an action or event may be implemented using the computer system 500 wherein the processes of FIGS. 1 to 4, to be described, may be implemented as one or more software application programs 533 executable within the computer system 500. In particular, the steps of the methods described are effected by instructions 531 (see FIG. 5B) in the software 533 that are carried out within the computer system 500. The software instructions 531 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 500 from the computer readable medium, and then executed by the computer system 500. A computer readable medium having such software or computer program recorded on the computer readable medium is a computer program product. The use of the computer program product in the computer system 500 preferably effects an advantageous apparatus for classifying an action or event.

The software 533 is typically stored in the HDD 510 or the memory 506. The software is loaded into the computer system 500 from a computer readable medium, and executed by the computer system 500. Thus, for example, the software 533 may be stored on an optically readable disk storage medium (e.g., CD-ROM) 525 that is read by the optical disk drive 512. A computer readable medium having such software or computer program recorded on it is a computer program product. The use of the computer program product in the computer system 500 preferably effects an apparatus for classifying an action or event.

In some instances, the application programs 533 may be supplied to the user encoded on one or more CD-ROMs 525 and read via the corresponding drive 512, or alternatively may be read by the user from the networks 520 or 522. Still further, the software can also be loaded into the computer system 500 from other computer readable media. Computer readable storage media refers to any non-transitory tangible storage medium that provides recorded instructions and/or data to the computer system 500 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 501. Examples of transitory or non-tangible computer readable transmission media that may also participate in the provision of software, application programs, instructions and/or data to the computer module 501 include radio or infra-red transmission channels as well as a network connection to another computer or networked device, and the Internet or Intranets including e-mail transmissions and information recorded on Websites and the like.

The second part of the application programs 533 and the corresponding code modules mentioned above may be executed to implement one or more graphical user interfaces (GUIs) to be rendered or otherwise represented upon the display 514. Through manipulation of typically the keyboard 502 and the mouse 503, a user of the computer system 500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 517 and user voice commands input via the microphone 580.

FIG. 5B is a detailed schematic block diagram of the processor 505 and a "memory" 534. The memory 534 represents a logical aggregation of all the memory modules (including the HDD 509 and semiconductor memory 506) that can be accessed by the computer module 501 in FIG. 5A.

When the computer module 501 is initially powered up, a power-on self-test (POST) program 550 executes. The POST program 550 is typically stored in a ROM 549 of the semiconductor memory 506 of FIG. 5A. A hardware device such as the ROM 549 storing software is sometimes referred to as firmware. The POST program 550 examines hardware within the computer module 501 to ensure proper functioning and typically checks the processor 505, the memory 534 (509, 506), and a basic input-output systems software (BIOS) module 551, also typically stored in the ROM 549, for correct operation. Once the POST program 550 has run successfully, the BIOS 551 activates the hard disk drive 510 of FIG. 5A. Activation of the hard disk drive 510 causes a bootstrap loader program 552 that is resident on the hard disk drive 510 to execute via the processor 505. This loads an operating system 553 into the RAM memory 506, upon which the operating system 553 commences operation. The operating system 553 is a system level application, executable by the processor 505, to fulfil various high level functions, including processor management, memory management, device management, storage management, software application interface, and generic user interface.

The operating system 553 manages the memory 534 (509, 506) to ensure that each process or application running on the computer module 501 has sufficient memory in which to execute without colliding with memory allocated to another process. Furthermore, the different types of memory available in the system 500 of FIG. 5A must be used properly so that each process can run effectively. Accordingly, the aggregated memory 534 is not intended to illustrate how particular segments of memory are allocated (unless otherwise stated), but rather to provide a general view of the memory accessible by the computer system 500 and how such is used.

As shown in FIG. 5B, the processor 505 includes a number of functional modules including a control unit 539, an arithmetic logic unit (ALU) 540, and a local or internal memory 548, sometimes called a cache memory. The cache memory 548 typically includes a number of storage registers 544-546 in a register section. One or more internal busses 541 functionally interconnect these functional modules. The processor 505 typically also has one or more interfaces 542 for communicating with external devices via the system bus 504, using a connection 518. The memory 534 is coupled to the bus 504 using a connection 519.

The application program 533 includes a sequence of instructions 531 that may include conditional branch and loop instructions. The program 533 may also include data 532 which is used in execution of the program 533. The instructions 531 and the data 532 are stored in memory locations 528, 529, 530 and 535, 536, 537, respectively. Depending upon the relative size of the instructions 531 and the memory locations 528-530, a particular instruction may be stored in a single memory location as depicted by the instruction shown in the memory location 530. Alternately, an instruction may be segmented into a number of parts each of which is stored in a separate memory location, as depicted by the instruction segments shown in the memory locations 528 and 529.

In general, the processor 505 is given a set of instructions which are executed therein. The processor 505 waits for a subsequent input, to which the processor 505 reacts to by executing another set of instructions. Each input may be provided from one or more of a number of sources, including data generated by one or more of the input devices 502, 503, data received from an external source across one of the networks 520, 502, data retrieved from one of the storage devices 506, 509 or data retrieved from a storage medium 525 inserted into the corresponding reader 512, all depicted in FIG. 5A. The execution of a set of the instructions may in some cases result in output of data. Execution may also involve storing data or variables to the memory 534.

The described arrangements use input variables 554, which are stored in the memory 534 in corresponding memory locations 555, 556, 557. The described arrangements produce output variables 561, which are stored in the memory 534 in corresponding memory locations 562, 563, 564. Intermediate variables 558 may be stored in memory locations 559, 560, 566 and 567.

Referring to the processor 505 of FIG. 5B, the registers 544, 545, 546, the arithmetic logic unit (ALU) 540, and the control unit 539 work together to perform sequences of micro-operations needed to perform "fetch, decode, and execute" cycles for every instruction in the instruction set making up the program 533. Each fetch, decode, and execute cycle comprises:

a fetch operation, which fetches or reads an instruction 531 from a memory location 528, 529, 530;

a decode operation in which the control unit 539 determines which instruction has been fetched; and an execute operation in which the control unit 539 and/or the ALU 540 execute the instruction.

Thereafter, a further fetch, decode, and execute cycle for the next instruction may be executed. Similarly, a store cycle may be performed by which the control unit 539 stores or writes a value to a memory location 532.

Each step or sub-process in the processes of FIGS. 1 to 4 is associated with one or more segments of the program 533 and is performed by the register section 544, 545, 547, the ALU 540, and the control unit 539 in the processor 505 working together to perform the fetch, decode, and execute cycles for every instruction in the instruction set for the noted segments of the program 533.

The method of classifying an action or event may alternatively be implemented in dedicated hardware such as one or more integrated circuits performing the functions or sub functions of the methods described. Such dedicated hardware may include graphic processors, digital signal processors, or one or more microprocessors and associated memories.

The arrangements described use a network of Relative Point Position (RPP) nodes 940, as shown in FIG. 9. The network of RPP nodes 940 is used as a part of the artificial neural network 900 for performing tasks such as classification, detection, segmentation and regression, from data such as video data and/or point data. The artificial neural method 900 may be implemented as one or more modules of the application 533. FIG. 9 shows the artificial neural network 900 receiving or obtaining video data containing a number of frames as input 910. The input data 910 may be obtained from a memory of the module 501, for example from the memory 506. Alternatively, the input 910 may be obtained from a camera, such as the camera 127, or from a device external to the module 501, such as via the network 520.

In the example of FIG. 9 the input data 910 is received by a first convolutional neural network 920. The convolutional neural network 920 processes the input data 910, and passes the output of the convolutional neural network 920, a set of feature responses, to a dense to sparse layer 930. The set of feature responses output by the convolutional neural network 920 includes activations relating to detection of objects and associated actions or events. The dense to sparse layer 930 receives the feature responses from the convolutional neural network 920 in form of a multi-dimensional array.

For example, the feature responses may be received as an array with 512 channels and with spatial dimensions of 50×30, and with temporal dimensions of 20 frames. The dense to sparse layer 930 produces a sparse encoding of the received feature responses, with a reduced or equal number of responses. Each response encodes the numerical value of the received response, and numerical values representing the spatial and temporal positions of the response. The Relative Point Position network 940 receives the sparse feature responses as input. For example, the Relative Point Position network 940 receives the sparse feature responses as a multi-dimensional array with 512 channels, 64 responses and 4 values per response, the values representing the response value, and the horizontal, vertical and temporal positions of the response. The Relative Point Position network 940 produces output representing the classification, detection or other output response for the given input instance 910.

In another implementation, the artificial neural network 900 receives input data as a set of sparse responses, rather than as a sequence of frames. In the input data, the set of sparse responses is encoded as a multi-dimensional array, containing a number of channels, a number of responses for each channel, and each response encodes the numerical value of the received response, and numerical values representing the spatial and temporal positions of the response. For example the sparse response data can be a representation of objects in a physical space, where the spatial positions represent coordinates on a surface, such as player positions on a sports field. The sparse response data can be tracking data derived using known tracking methods such as tracking sensors or the like. In the implementation where the artificial neural network 900 receives input data as a set of sparse feature responses, the artificial neural network does not include the convolutional neural network 920 or the dense to sparse layer 930. The input data, the set of sparse responses, is input directly to the Relative Point Position network 940.

Figure 6:
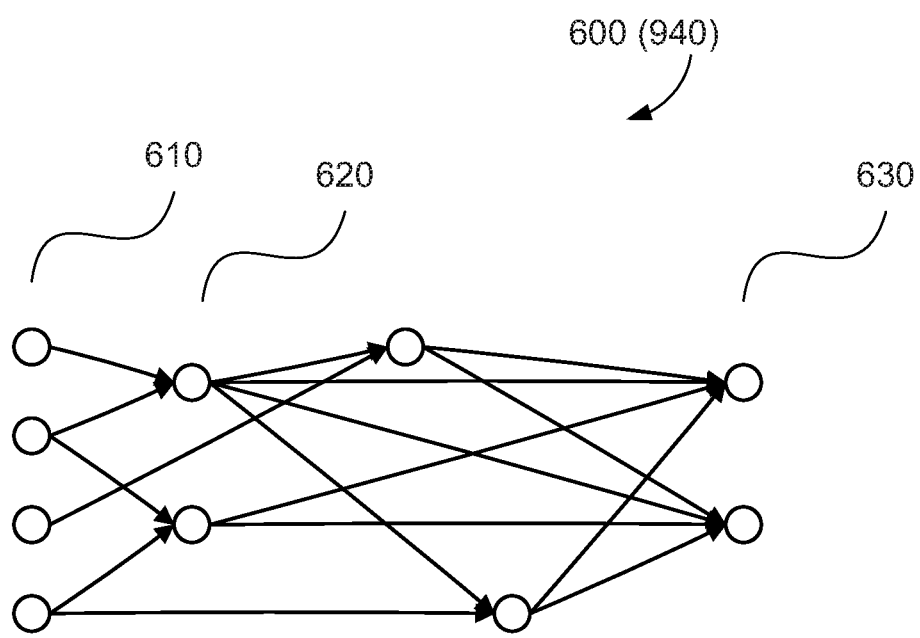
FIG. 6 shows a schematic block diagram illustrating a network of Relative Point Position (RPP) nodes.

The structure of the Relative Point Position network 940 is shown as a network 600 in FIG. 6. Input nodes 610 of the network 600 receive the input responses of the network 600. The input responses 610 can be, for example, a multi-dimensional array of feature responses with 512 channels, 64 responses and 4 values per response. In the example of FIG. 6, each of the 512 channels corresponds to an input node of the network 610, and each node is represented by 64 responses, where each response has 4 numeric values representing the (i) response value, (ii) a horizontal spatial position value, (iii) a vertical spatial position value, and (iv) a temporal value. The input responses can be determined from video data by the convolutional neural network 920 and the dense to sparse layer 930 or can comprise tracking data. All 512 input nodes are not shown. If tracking data and position information regarding objects in a scene is already available as point data, each response can have 3 numeric values, being values of horizontal, vertical and spatial position values (the response value is set to 1). For one dimensional tracking information, the response can have a single numeric value for the position data and, in some implementations, two numeric values being the response value and the position value. A response value is preferably included in all implementations for improved accuracy of results.

The Relative Point Position network 600 contains a number of Relative Point Position nodes 620, for example 20,000 Relative Point Position nodes. An example of four Relative Point Position nodes 620 is shown in FIG. 6 for ease of reference. Each Relative Point Position node 620 is part of a layer of the Relative Point Position network 600. In the example of FIG., each Relative Point Position node 620 is connected to two child nodes, each child node being either another Relative Point Position node 620 in a lower layer of the Relative Point Position network 600, or an input node 610 of the Relative Point Position network 600. In a second arrangement each Relative Point Position node 620 is connected to 3 or more child nodes.

The Relative Point Position network 600 contains a number of output nodes 630 (an example of two output nodes 630 is shown in FIG. 6). In one embodiment, such as the example arrangement of FIG. 6, each output node 630 is connected to all of the Relative Point Position nodes 620 of the Relative Point Position network 600. In a second embodiment each output node 630 is connected to a combination of Relative Point Position nodes 620 of the network or to no Relative Point Position nodes 620.

Each Relative Point Position node 620 receives input from the corresponding child nodes. In one example each Relative Point Position node produces a set of responses, for example 64 responses, where each response contains 4 values, representing the response value, and horizontal, vertical (spatial position) and temporal values. In another arrangement each response of a Relative Point Position node is determined from one response from each child node. The responses of the Relative Point Position nodes 620 correspond with objects, persons, or other visual properties present in the input data, for example persons visible in video data, whose actions are to be classified. Effectively, each of the nodes 620 receives feature responses corresponding to point data from at least two (first and second) channels and generates a third channel response. The third channel responses are output by the nodes 620. The third channel responses may be provided to another of the Relative Point Position nodes 620. Alternatively, the third channel responses may be provided to one of the output nodes 630 for classification.

Each output of the output nodes 630 receives input from the Relative Point Position nodes 620 connected to the output node 630, and produces a response or set of responses. The response at an output node 630 typically represents a classification of an action or event. In one arrangement each output response contains a response value, and horizontal, vertical and spatial position values. In a second arrangement each output node 630 produces a single output response, containing a single response value.

Figure 7:
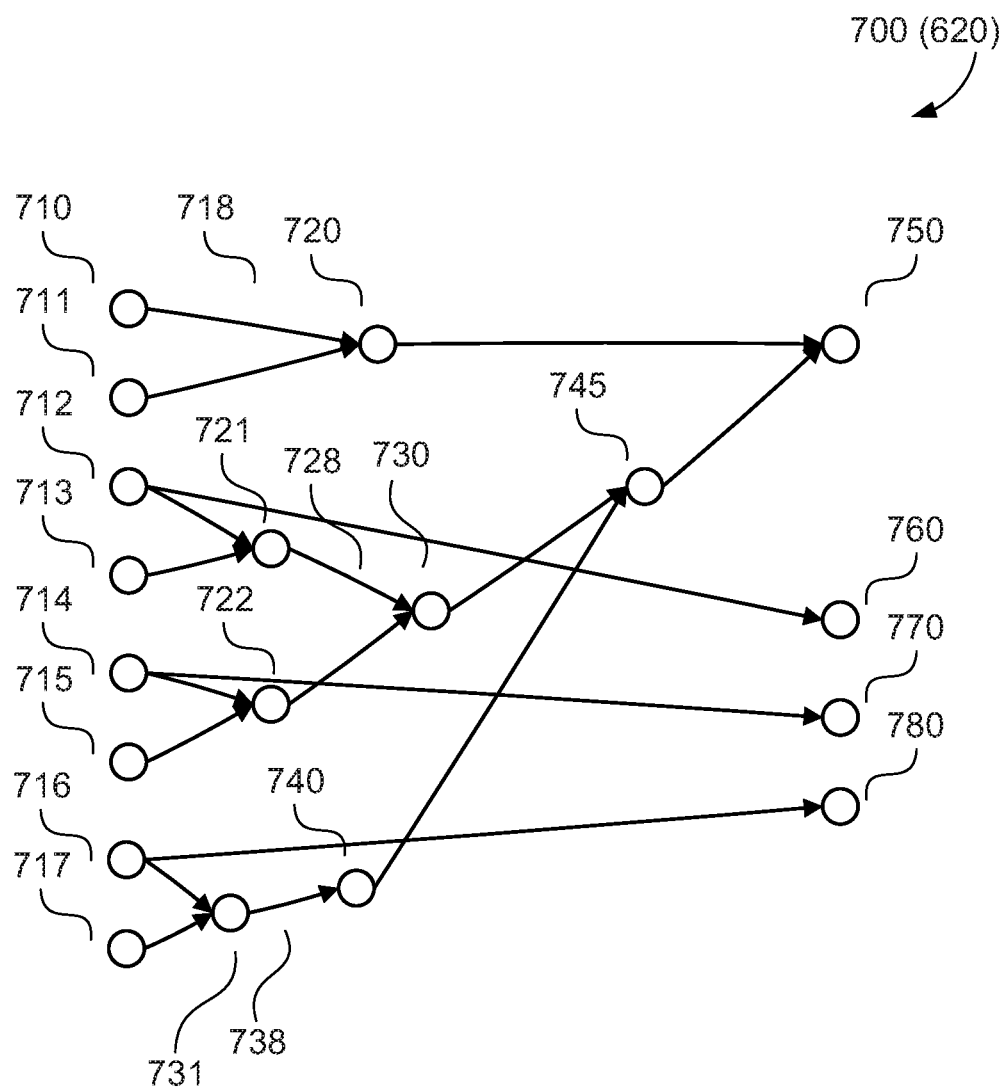
FIG. 7 shows a schematic block diagram illustrating a Relative Point Position node of FIG. 6.

FIG. 7 is a schematic block diagram, showing the structure of a Relative Point Position node 700, representing one of the input nodes 620 of FIG. 6 according to one arrangement. Value 710 represents a response value $r_1$ for the first child node of the Relative Point Position node 700. Value 711 represents a response value $r_2$ for the second child node of the Relative Point Position node 700. Value 712 represents a horizontal position value $h_1$ for the first child node of the Relative Point Position node 700. Value 713 represents a horizontal position value $h_2$ for the second child node of the Relative Point Position node 700. Value 714 represents a vertical position value $v_1$ for the first child node of the Relative Point Position node 700. Value 715 represents a vertical position value $v_2$ for the second child node of the Relative Point Position node 700. Value 716 represents a temporal position value $t_1$ for the first child node of the Relative Point Position node 700. Value 717 represents a temporal position value $t_2$ for the second child node of the Relative Point Position node 700. In the example of FIG. 7, the inputs of the first and second child nodes relate to feature responses corresponding to point data in first and second channels respectively.

Edges 718 represent a bias value $b_1$, and weighted edges $w_1$ and $w_2$, which connect the response value $r_1$ 710 and the response value $r_2$ 711 respectively with a weighted response value $v_r$ 720. The weighted response value $v_r$ 720 is determined according to Equations (1) and (2):

$$s_r = r_1 w_1 + r_2 w_2 + b_1 \qquad \text{Equation (1)}$$

$$v_r = \max(s_r, 0) \qquad \text{Equation (2)}$$

A spatial response value $v_s$ 730 is determined from a horizontal displacement value $d_h$ 721, a vertical displacement value $d_w$ 722, and a weighted edge $w_3$ and bias $b_3$ 728. The horizontal displacement value $d_h$ 721 is determined from the child horizontal position values $h_1$ 712 and $h_2$ 713, and the vertical displacement value $d_w$ 722 is determined from the child vertical position values $v_1$ 714, and $v_2$ 715. The spatial response value $v_s$ 730 is determined according to Equations (3) to (7):

$$d_h = h_1 - h_2 \qquad \text{Equation (3)}$$

$$d_w = v_1 - v_2 \qquad \text{Equation (4)}$$

$$d = \sqrt{d_h^2 + d_w^2} \qquad \text{Equation (5)}$$

$$s_s = w_3 d + b_3 \qquad \text{Equation (6)}$$

$$v_s = \min(\max(s_s, 0), 1) \qquad \text{Equation (7)}$$

In Equations (3) to (7) d is the euclidian distance corresponding with the positions $d_h$ and $d_w$, and $s_s$ is a weighted combination of $w_3$, d and $b_3$.

Figure 11A:
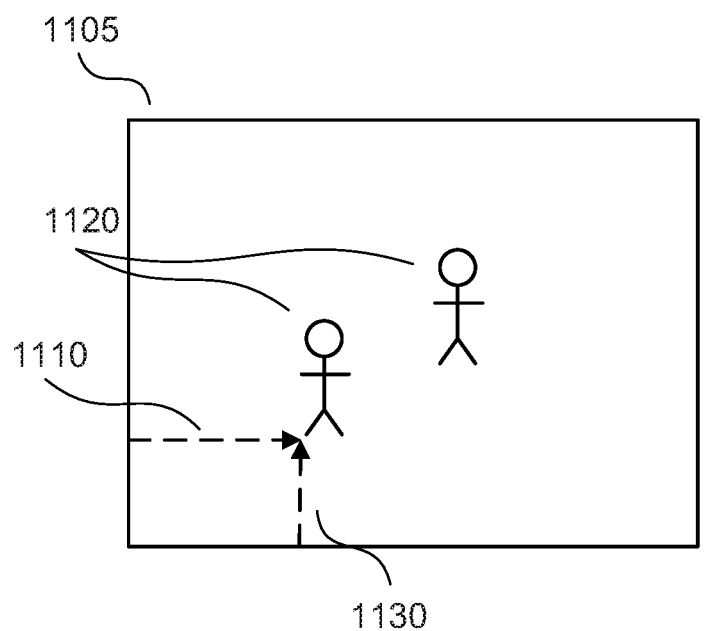
FIGS. 11A and 11B show examples of input data, such as video data and tracking data, and spatial position values corresponding with objects present in the data.
Figure 11B:
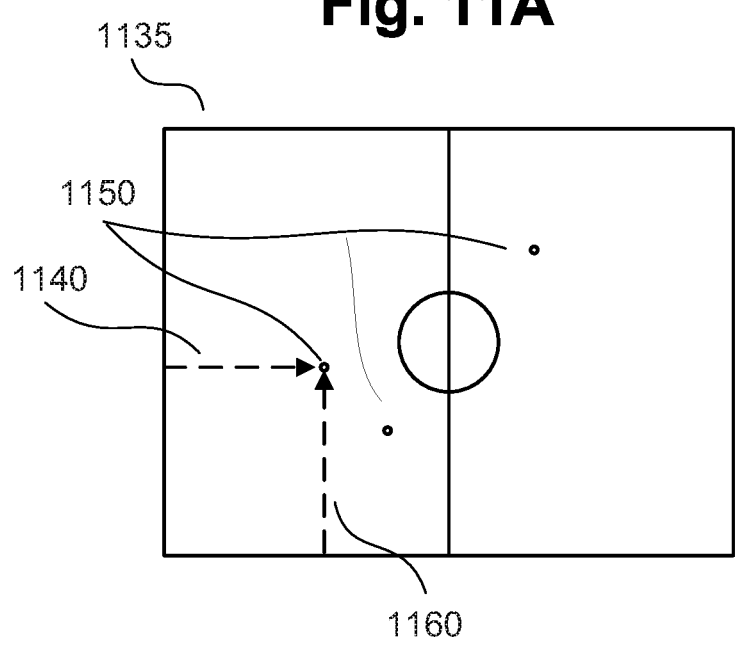

FIGS. 11A and 11B provide examples of input data, such as video data and tracking data, and spatial position values corresponding with objects present in the data. An example video frame 1105, shown in FIG. 11A, contains two persons 1120 visible in the video frame 1105. A horizontal position value 1110 and a vertical position value 1130 corresponding to a foot of one of the persons 1120 present in the video frame 1105 are shown. The horizontal and vertical position values relate to pixel positions in the video frame 1105.

FIG. 11B provides a second example of a sporting field 1135 and a plurality of sports players 1150 present on the sporting field 1135, as recorded in sports player tracking data. A horizontal position value 1140 and a vertical position value 1160 corresponding to one of the players 1150 on the sporting field are shown. The horizontal and vertical position values relate to coordinates in the scene 1135 rather than pixel values. FIGS. 11A and 11B show that point data relating to horizontal and vertical spatial location can be determined from video data or from tracking information. Temporal information can be determined from each frame. The present disclosure describes spatial location data in terms of horizontal and vertical position in a frame. In other arrangements, the spatial location data may be described using different parameters relating to the scene, for example "north-south" and "east-west" of the sporting field 1135.

Referring back to FIG. 7, a temporal response value $v_t$ 740 is determined from the temporal displacement value $d_t$ 731, and the weighted edge $w_4$ and bias and $b_4$ 738. The temporal displacement value $d_t$ 731 is determined from the child temporal position values $t_1$ 716 and $t_2$ 717. The temporal response value $v_t$ 740 is determined according to Equations (8) to (10):

$$d_t = t_1 - t_2 \qquad \text{Equation (8)}$$

$$s_t = w_4 d_t + b_4 \qquad \text{Equation (9)}$$

$$v_t = \min(\max(s_t, 0), 1) \qquad \text{Equation (10)}$$

In Equations (8) to (10) $s_t$ is a weighted combination of $w_4$, $d_t$ and $b_4$.

An attenuation function $v_a$ 745, which provides an attenuation response according to the spatial response value 730 and temporal response value 740, is determined according to Equation (11):

$$v_a = v_s v_t \quad \text{Equation (11)}$$

A Relative Point Position node response value $r_o$ 750 is determined from the weighted response value $v_r$ 720 and the attenuation function 745 according to Equation (12):

$$r_o = v_r v_a \quad \text{Equation (12)}$$

The node response value $r_o$ 750 represents a third feature response generated from the input values 710 to 717 corresponding to two channels. The node response value $r_o$ 750 is generated by the attenuation function 745 using the weighted combination of the spatial and temporal location information of the first and second channels using Equations (1) to (8). The node response value $r_o$ 750 can also include associated spatial and temporal position information relating to the objects in the video or tracking data. To generate the spatial and temporal elements, Relative Point Position node horizontal position value $h_o$ 760, vertical position value $v_o$ 770 and temporal position value $t_o$ 780 are determined according to Equations (13) to (15):

$$h_o = h_1 \quad \text{Equation (13)}$$

$$v_o = v_1 \quad \text{Equation (14)}$$

$$t_o = t_1 \quad \text{Equation (15)}$$

In the example of FIG. 7 the horizontal position value $h_o$ 760, vertical position value $v_o$ 770 and temporal position value $t_o$ 780 are set as equal to the corresponding or associated position values of one of the child nodes, being the first child node. In another arrangement the horizontal position value $h_o$ 760, vertical position value $v_o$ 770 and temporal position value $t_o$ 780 are set to the average of the corresponding position values of the two child nodes.

Figure 8:
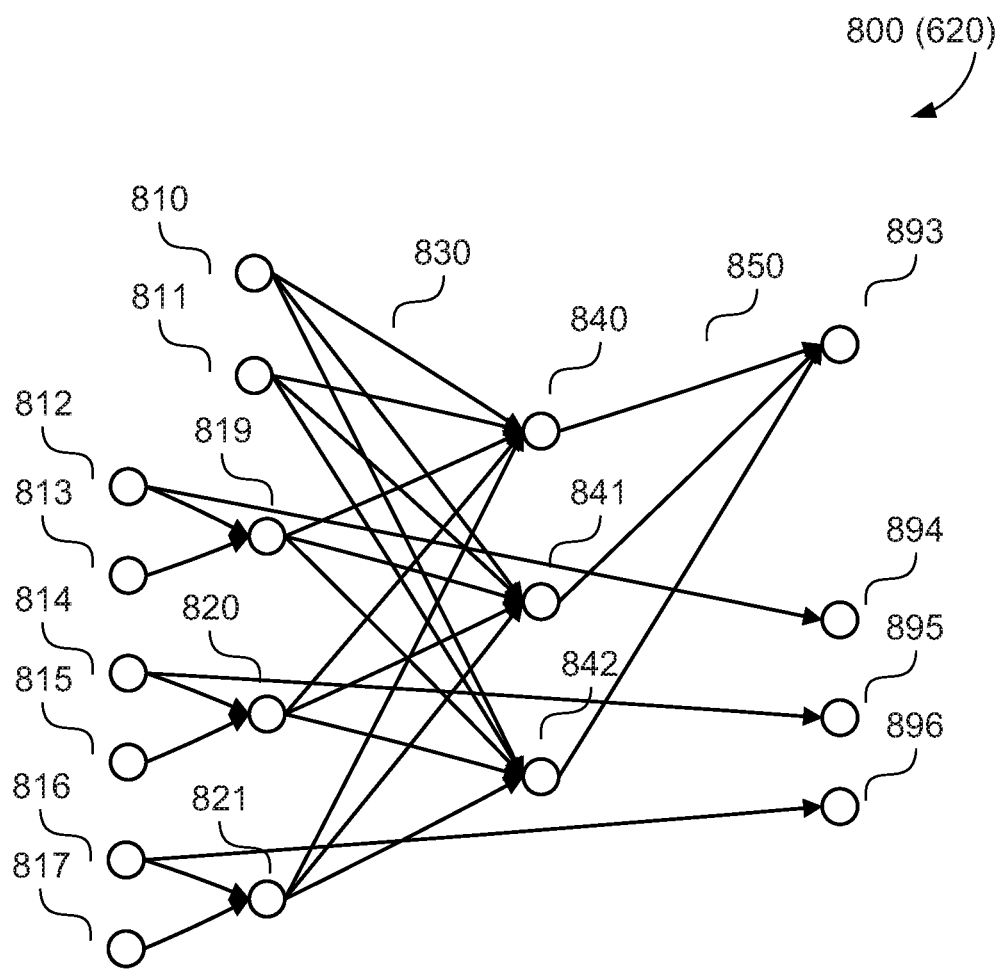
FIG. 8 shows a schematic block diagram illustrating a second implementation of Relative Point Position node of FIG. 6.

FIG. 8 shows the structure of a Relative Point Position node 800, representing a different implementation to FIG. 7 of one of the nodes 620 of FIG. 6. Value 810 represents a response value $r_1$ for the first child node of the Relative Point Position node 800. Value 811 represents a response value $r_2$ for the second child node of the Relative Point Position node 800. Value 812 represents a horizontal position value $h_1$ for a first child node of the Relative Point Position node 800. Value 813 represents a horizontal position value $h_2$ for the second child node of the Relative Point Position node 800. Value 814 represents a vertical position value $v_1$ for the first child node of the Relative Point Position node 620. Value 815 represents the vertical position value $v_2$ for the second child node of the Relative Point Position node 620. Value 816 represents a temporal position value $t_1$ for the first child node of the Relative Point Position node 800. Value 817 represents a temporal position value $t_2$ for the second child node of the Relative Point Position node 800. The inputs to the node 800 are similar to the input to the node 700.

Displacement values $d_h$ 819, $d_w$ 820 and $d_t$ 821 are determined as follows:

$$d_h = h_1 - h_2 \quad \text{Equation (16)}$$

$$d_w = v_1 - v_2 \quad \text{Equation (17)}$$

$$d_t = t_1 - t_2 \quad \text{Equation (18)}$$

Intermediate values $r_3$ 840, $r_4$ 841 and $r_5$ 842 are determined from the displacement values $d_h$ 819, $d_w$ 820 and $d_t$ 821, child response values $r_1$ 810 and $r_2$ 811, and weighted edges and biases $w_{11}$, $w_{12}$, $w_{13}$, $w_{21}$, $w_{22}$, $w_{23}$, $w_{31}$, $w_{32}$, $w_{33}$, $w_{41}$, $w_{42}$, $w_{43}$, $w_{51}$, $w_{52}$, $w_{53}$, $b_1$, $b_2$, $b_3$, indicated by 830 as follows:

$$r_3 = \max(r_1 w_{11} + r_2 w_{21} + d_h w_{31} + d_w w_{41} + d_t w_{51} + b_1, 0) \quad \text{Equation (19)}$$

$$r_4 = \max(r_1 w_{12} + r_2 w_{22} + d_h w_{32} + d_w w_{41} + d_t w_{51} + b_2, 0) \quad \text{Equation (20)}$$

$$r_5 = \max(r_1 w_{13} + r_2 w_{23} + d_h w_{33} + d_w w_{43} + d_t w_{53} + b_3, 0) \quad \text{Equation (21)}$$

A Relative Point Position node response value $r_o$ 893 is determined from the intermediate values $r_3$ 840, $r_4$ 841 and $r_5$ 842 and the weighted edges and biases $w_{61}$, $w_{71}$, $w_{81}$, $b_4$, indicated as 850, as follows:

$$r_o = \max(r_3 w_{61} + r_4 w_{71} + r_5 w_{81} + b_4, 0) \quad \text{Equation (22)}$$

The node response value $r_o$ 893 represents a third feature response generated from the input values 810 to 817 corresponding to two channels. The response node response value $r_o$ 893 is generated using a weighted combination of the associated temporal and spatial values 812 to 817, as defined in Equations (19) to (22). The corresponding spatial and temporal elements comprise a Relative Point Position node horizontal position value $h_o$ 894, vertical position value $v_o$ 895 and temporal position value $t_o$ 896, and are determined according to:

$$h_o = h_1 \quad \text{Equation (23)}$$

$$v_o = v_1 \quad \text{Equation (24)}$$

$$t_o = t_1 \quad \text{Equation (25)}$$

Figure 1:
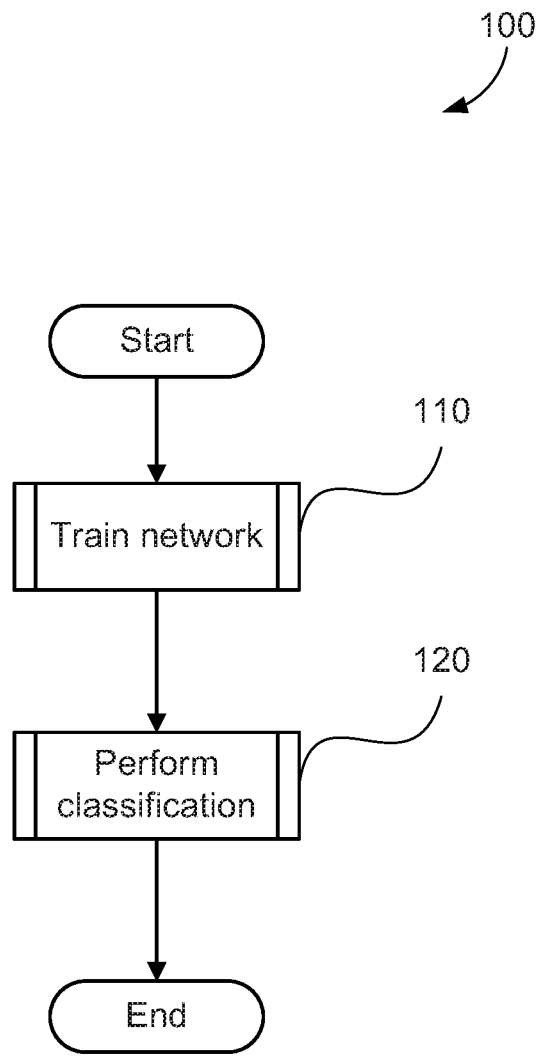
FIG. 1 shows a schematic flow diagram illustrating a method of performing training and classification of the artificial neural network.

FIG. 1 shows a method 100 for performing training of an artificial neural network and using the trained artificial neural network to perform classification of video data to classify action. The method 100 is typically implemented as one or more modules of the application 533, stored in the memory 506 and controlled under execution of the processor 505.

The method 100 starts at a training step 110. The training step 110 operates to train an artificial neural network, such as the artificial neural network 900. A method 200 of training the artificial neural network 900, as implemented at step 110, is described hereafter in relation to FIG. 2. The method 100 continues under execution of the processor 505 from step 110 to a classification step 1200. The step 120 operates to use the trained network generated by step 110 to perform classification of an action or event from video data or tracking data provided as point data. A method 400 of performing classification, as implemented at step 120, is described hereafter in relation to FIG. 4.

Figure 2:
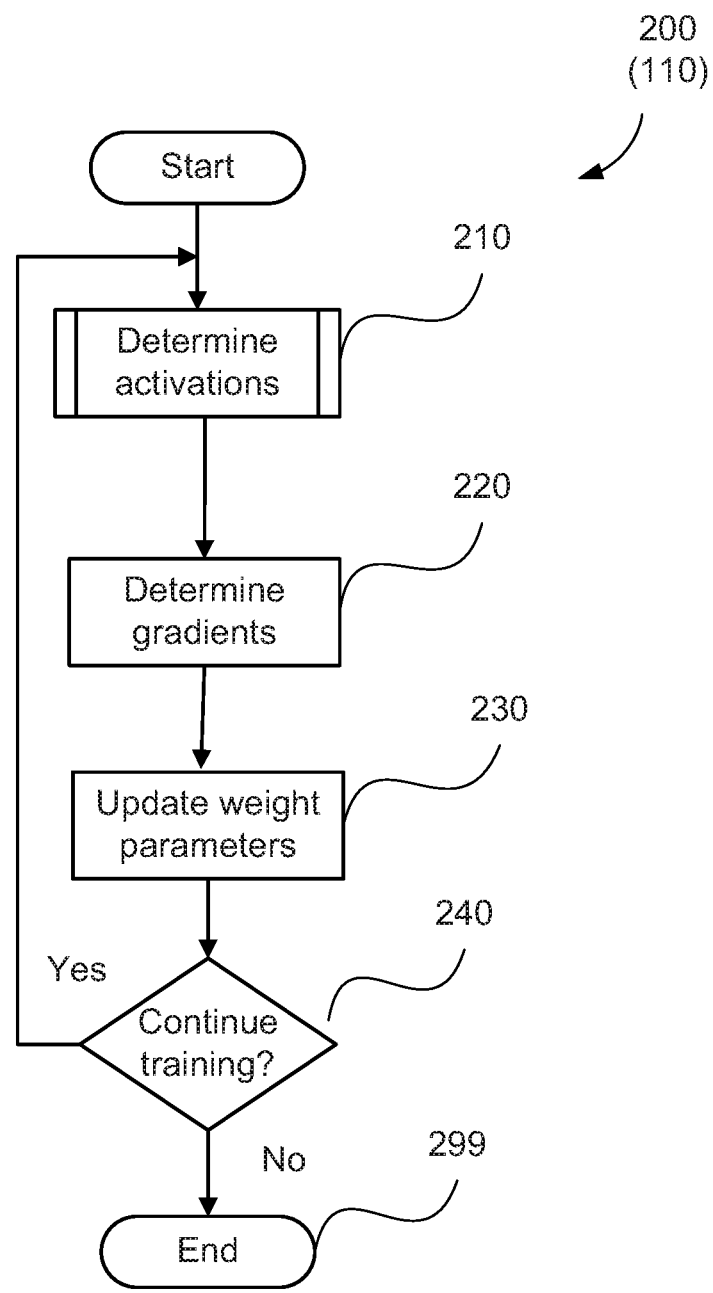
FIG. 2 shows a schematic flow diagram illustrating a method of performing training of the artificial neural network as used in the method of FIG. 1.

FIG. 2 shows the method 200 of performing training of the artificial neural network 900, as implemented at step 110 of FIG. 1. The method 200 is typically implemented as one or more modules of the application 533, stored in the memory 506 and controlled under execution of the processor 505.

The method 200 starts at a determining step 210. The activation values of the artificial neural network 900 for an instance or a set of instance videos are determined at execution of step 210. In the step 210, the input (instance or a set of instance videos) is annotated and provides a training set.

Figure 4:
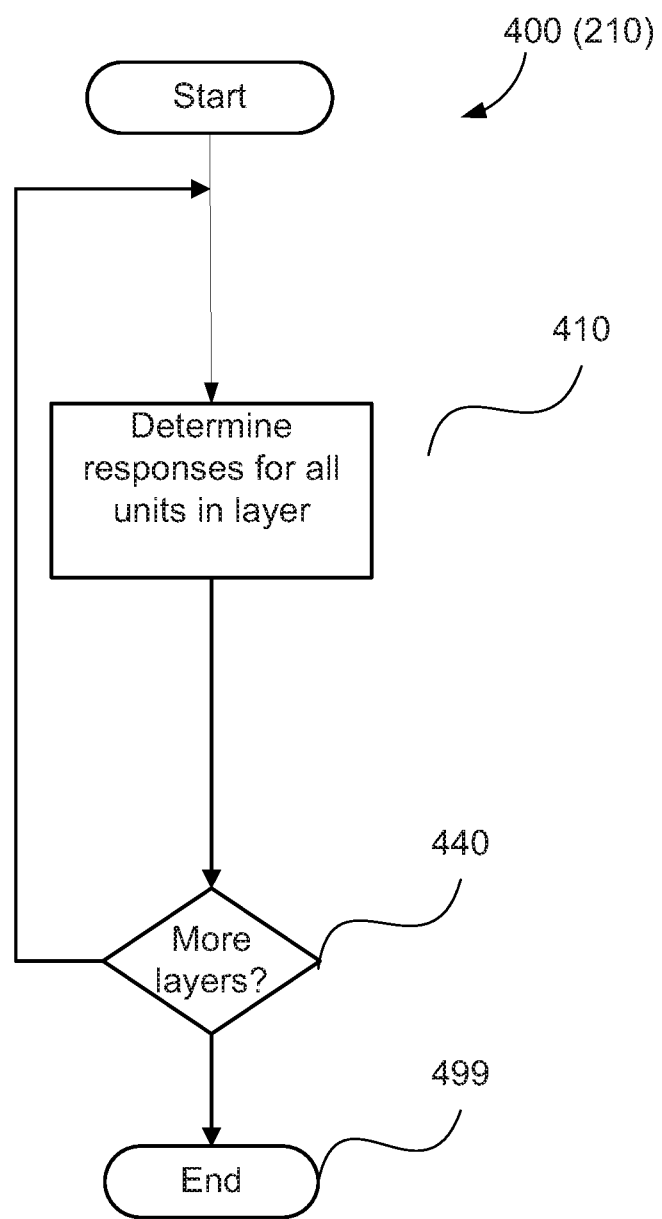
FIG. 4 shows a schematic flow diagram illustrating a method of finding activations as used in the methods of FIG. 2 and FIG. 3.

FIG. 4 shows a method 400 of determining the activation values of the artificial neural network 900, as implemented at step 210. The method 400 is typically implemented as one or more modules of the application 533, stored in the memory 506 and controlled under execution of the processor 505.

The method 400 starts at a determining step 410. The step 410 executes in a first iteration to find or determine the response values for the first layer of the network 900. The first layer of the artificial neural network 900 can relate to the first layer of the convolutional network 900. Alternatively, if the input 910 comprises point data rather than video data, the first layer of the artificial neural network relates to the first layer of the Relative Point Position network 940 (for example nodes 620 having child nodes 610 only) and determining responses of the nodes of the layer.

The method 400 continues to a check step 440. The step 440 executes to determine if more layers are present in the artificial neural network 900. If more layers are present ("Y" at step 440), the method 400 returns to step 410 and determines responses for all units in the next layer of the artificial neural network 900. The method 400 proceeds via step 410 and 440 to finding the response values for the second and subsequent layers of the network 900.

In implementations where the input 910 is video data, the next layer can relate to a next layer or the convolutional neural network 920, a first or deeper layer of the dense to sparse layer 930, or a first or deeper layer of the Relative Point Position network 940. In implementations where the input 910 is point data, the next layer relates to a further or deeper layer of the Relative Point Position network 940.

Accordingly, the method 400 defines activation values for nodes of the artificial neural network 900, a classification for each instance presented to the artificial neural network 900. The method 400 also defines an evaluation of how well the response of the network satisfies the objective, also known as the cost or loss score, c. If responses for all layers have been determined ("N" at step 440), the method 400 ends.

Referring back to FIG. 2, the method 200 continues under control of the processor 505 from step 210 to a determining step 220. For each training instance, or set of training instances in the training set, the gradient $$\frac{\partial c}{\partial p}$$

of the cost c with respect to each trainable parameter p is determined at step 220 using the chain rule.

The method 200 continues from step 220 to an updating step 230. The trainable parameters of the artificial neural network 900 are updated at step 230 according to the gradient of the cost value with respect to the trainable parameters determined at step 220. Examples of trainable parameters in the Relative Point Position nodes 700 shown in FIG. 7 are the weighted edges and biases 718, 728 and 738.

Each trainable parameter p is updated at step 230 using the corresponding gradient value. In one implementation each trainable parameter p is updated according to gradient $$\frac{\partial c}{\partial p}$$

of the cost c with respect to the parameter p, as follows:

$$p = p - \alpha \frac{\partial c}{\partial p} \qquad \text{Equation (26)}$$

In Equation (26) a is a hyper-parameter representing the rate of learning for each training instance.

The method 200 continues form a step 230 to a check step 240. The step 240 determines if training is to be terminated by determining if a stopping criterion is reached. The stopping criterion is reached for example when a fixed number of instances have been processed. Alternatively, the stopping criterion is reached when the cost or classification values produced satisfy a requirement such as a cost threshold or a predetermined level of classification values has been reached.

Figure 3:
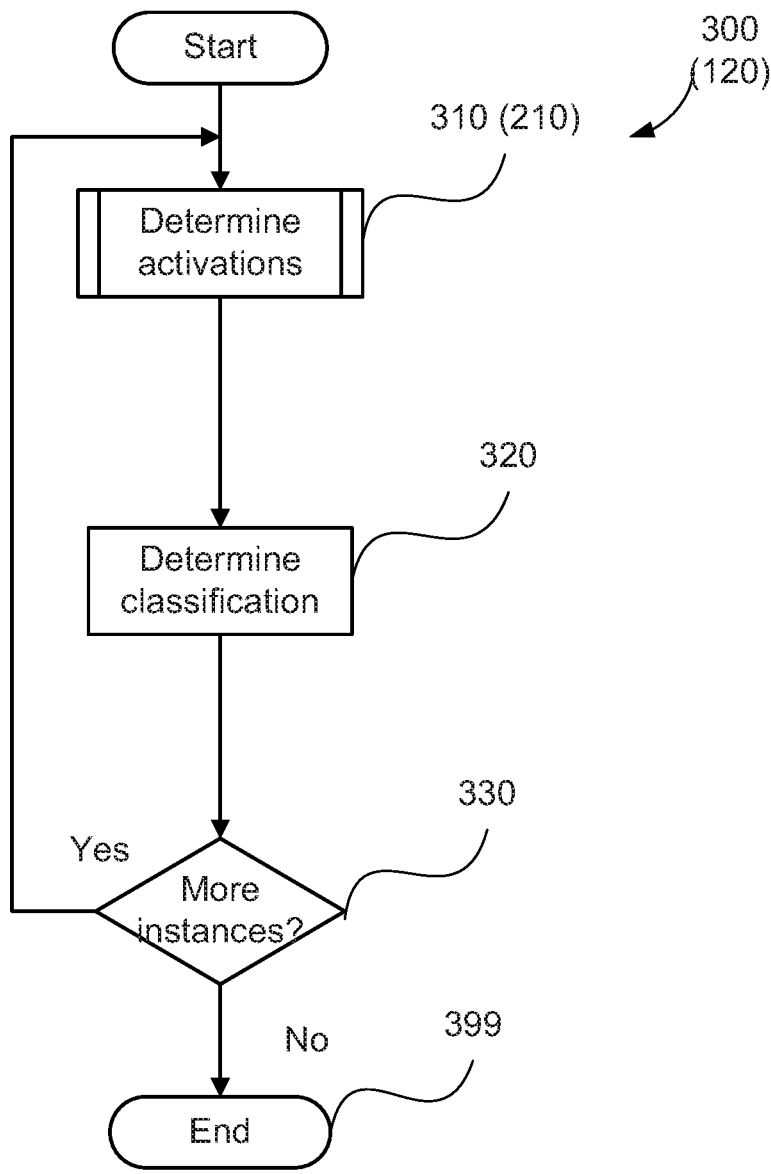
FIG. 3 shows a schematic flow diagram illustrating a method of performing classification as used in the method of FIG. 1.

FIG. 3 shows a method 300 for performing classification of an action or event using the artificial neural network 900 trained at step 110. The method 300 relates to step 120 of FIG. 1. The method 300 is typically implemented as one or more modules of the application 533, stored in the memory 506 and controlled under execution of the processor 505.

An input to the method 300 can be video data containing objects whose actions are to be classified, such as the input 910 showed in FIG. 9. Alternatively, the input to the method 300 can be point data reflecting tracking data of the objects.

The method 300 starts at a determining step 310. The determining step 310 operates to determine activations of the artificial neural network 900 and operates in the same manner as the method 400. In the method 300 however, the input (point data or video data) is not training data and does not include training annotations. In step 310, the input is provided to the artificial neural network as trained at step 110.

The method 300 continues under execution of the processor 505 from step 310 to a classification step 320. The classification step 220 operates to classify an action or event from the activations of step 310 by applying a corresponding label based on the activation values of the output nodes 630.

The arrangements described are applicable to the computer and data processing industries and particularly for the machine learning and image processing industries.

An example of automated classification of video relates to identifying actions associated with a soccer game. The example for a soccer game is used to identify player actions, such as kicking, dribbling and passing, in videos of soccer. Further input data used for classification is tracking data of player positions on the field at each point in time in a game.

The training dataset contains annotations of events of interest, identifying the start and end time of an event such as a pass, the classification label ('pass'), and bounding boxes of players involved for each frame. The classifier used for performing classification of the label of an event present, and detection of the start and end frames of an event, is the artificial neural network 900. Training of the artificial neural network 900 is performed by presenting annotated instances of video 910, with the corresponding annotated label and start and end temporal positions, to train the artificial neural network 900.

Existing methods may only perform the training and classification task on input video instances with spatial dimension of approximately 120×120 pixels, and 20 frames. Longer input video instances are not able to fit in the available memory of a Graphics Processing Unit (GPU) card with 12 GB of memory.

In the arrangements described, the artificial neural network 900 is trained by passing instances of video and annotations of classification label and start and end positions, using the methods described above. The arrangements described are able to operate with lower memory requirements than previous solutions, due to the ability to receive input to the Relative Point Position network 940 using input data in point data form that is sparse, and requires less memory than if a dense multi-dimensional array were used. As a result the present invention is able to be trained and perform classification on video instances that are longer than the 20 frames that is a limitation of existing methods. The use of longer video instances allows identification of events that occur over longer periods of time, and higher classification and detection accuracy.

A second example of use is to perform classification using both video data and tracking data, the tracking data containing information of the position of players on the field at each point in time. The tracking data is represented using a response for each player for each point in time, encoded using a response value indicating the player is present, and values of the position of the player on the field. The tracking data is provided as input to the Relative Point Position network 940, and trained using the annotations of the start and end frames and classifications of events. This implementation for classification of events using player tracking data produces classification of events and the start and end frames that they occur. This method provides higher classification accuracy than existing artificial neural network methods, which do not typically operate successfully using data with position values encoded as numeric values. The responses of the player position classifying network is combined with the responses of the video classification network, and produces high accuracy classification and detection of event start and end positions of events present in the video and tracking data.

The foregoing describes only some embodiments of the present invention, and modifications and/or changes can be made thereto without departing from the scope and spirit of the invention, the embodiments being illustrative and not restrictive.

The invention claimed is:

1. A method of classifying an action or event relating to a plurality of objects in a scene of video data using an artificial neural network, the method comprising:

obtaining a first plurality of feature responses corresponding to point data in a first channel and a second plurality of feature responses corresponding to point data in a second channel, each feature response of the first and second plurality of feature responses comprising a temporal position value that indicates a temporal position in the video data, a spatial position value that indicates a spatial position of at least one object among the plurality of objects at the temporal position value, and a response value derived at a node in a predetermined layer of the artificial neural network, the first and second plurality of feature responses relating to the plurality of objects in the scene of the video data and having associated temporal and spatial position values;

generating a third plurality of feature responses comprising a temporal position value that indicates a temporal position in the video data, a spatial position value that indicates a spatial position of at least one object among the plurality of objects at the temporal position value, and a response value derived at a node in a layer subsequent to the predetermined layer of the artificial neural network, each of the third plurality of feature responses being generated based on calculation in the layer subsequent to the predetermined layer of the artificial neural network, the calculation being performed using one of the first plurality of feature responses from the first channel, inputted to the layer subsequent to the predetermined layer of the artificial neural network, and one of the second plurality of feature responses from the second channel, inputted to the layer subsequent to the predetermined layer of the artificial neural network, and a weighted combination of associated temporal and spatial position values which correspond to one of the received first and second plurality of feature responses; and classifying an action or event relating to the plurality of objects in the scene using the artificial neural network based on the generated third plurality of feature responses.

2. The method according to claim 1, wherein each of the first and second channels reflects a semantic property of the plurality of objects.

3. The method according to claim 1, wherein the first and second plurality of feature responses comprise tracking information associated with the plurality of objects.

4. The method according to claim 1, wherein the artificial neural network comprises a convolutional neural network, the method further comprising using the convolutional neural network to generate the first and second plurality of feature responses from video data of the scene.

5. The method according to claim 1, wherein the artificial neural network further comprises a dense to sparse layer, and output of the convolutional neural network is provided to the dense to spare layer to generate the first and second plurality of feature responses.

6. The method according to claim 1, wherein the third plurality of feature responses includes associated spatial and temporal position information of the plurality of objects in the scene.

7. The method according to claim 6, wherein the associated spatial and temporal position information comprises spatial and temporal position values associated with one of the first and second channels.

8. The method according to claim 6, wherein the associated spatial and temporal position information comprises an average of spatial and temporal position values associated with the first and second channels.

9. The method according to claim 6, wherein the spatial and temporal position information relates to coordinates in a scene determined from tracking data.

10. The method according to claim 6, wherein the spatial and temporal position information relates pixel positions corresponding to the plurality of objects in the video data.

11. The method according to claim 1, wherein the weighted combination of associated temporal and spatial position values of the corresponding one of the received first and second plurality of feature responses is determined using differences between the spatial and temporal position values of the first and second plurality of feature responses.

12. The method according to claim 1, wherein the third plurality of feature responses is generated based on one of the first plurality of feature responses from the first channel and one of the second plurality of feature responses from the second channel, and a response of an attenuation function using the weighted combination of the associated temporal and spatial position values of the corresponding one of the received first and second plurality of feature responses.

13. The method according to claim 1, wherein the spatial position value includes a horizontal position value and a vertical position value.

14. A non-transitory computer readable storage medium storing program instructions for classifying an action or event relating to a plurality of objects in a scene of video data using an artificial neural network, the program comprising:
  code for obtaining a first plurality of feature responses corresponding to point data in a first channel and a second plurality of feature responses corresponding to point data in a second channel, each feature response of the first and second plurality of feature responses comprising a temporal position value that indicates a temporal position in the video data, a spatial position value that indicates a spatial position of at least one object among the plurality of objects at the temporal position value, and a response value derived at a node in a predetermined layer of the artificial neural network, the first and second plurality of feature responses relating to the plurality of objects in the scene of the video data and having associated temporal and spatial position values;
  code for generating a third plurality of feature responses comprising a temporal position value that indicates a temporal position in the video data, a spatial position value that indicates a spatial position of at least one object among the plurality of objects at the temporal position value, and a response value derived at a node in a layer subsequent to the predetermined layer of the artificial neural network, each of the third plurality of feature responses being generated based on calculation in the layer subsequent to the predetermined layer of the artificial neural network, the calculation being performed using one of the first plurality of feature responses from the first channel, inputted to the layer subsequent to the predetermined layer of the artificial neural network, and one of the second plurality of feature responses from the second channel, inputted to the layer subsequent to the predetermined layer of the artificial neural network, and a weighted combination of associated temporal and spatial position values which correspond to one of the received first and second plurality of feature responses; and
  code for classifying an action or event relating to the plurality of objects in the scene using the artificial neural network based on the generated third plurality of feature responses.

15. Apparatus for classifying an action or event relating to a plurality of objects in a scene of video data, comprising:
  one or more processors; and
  one or more memory devices storing a software program for directing the processor to:
  obtain a first plurality of feature responses corresponding to point data in a first channel and a second plurality of feature responses corresponding to point data in a second channel, each feature response of the first and second plurality of feature responses comprising a temporal position value that indicates a temporal position in the video data, a spatial position value that indicates a spatial position of at least one object among the plurality of objects at the temporal position value, and a response value derived at a node in a predetermined layer of the artificial neural network, the first and second plurality of feature responses relating to the plurality of objects in the scene of the video data and having associated temporal and spatial position values;
  generate a third plurality of feature responses comprising a temporal position value that indicates a temporal position in the video data, a spatial position value that indicates a spatial position of at least one object among the plurality of objects at the temporal position value, and a response value derived at a node in a layer subsequent to the predetermined layer of the artificial neural network, each of the third plurality of feature responses being generated based on calculation in the layer subsequent to the predetermined layer of the artificial neural network, the calculation being performed using one of the first plurality of feature responses from the first channel, inputted to the layer subsequent to the predetermined layer of the artificial neural network, and one of the second plurality of feature responses from the second channel, inputted to the layer subsequent to the predetermined layer of the artificial neural network, and a weighted combination of associated temporal and spatial position values which correspond to one of the received first and second plurality of feature responses; and
  classify an action or event relating to the plurality of objects in the scene using the artificial neural network based on the generated third plurality of feature responses.

16. A system classifying an action or event relating to a plurality of objects in a scene of video data using an artificial neural network, the system comprising:
  one or more processors; and
  one or more memory devices storing a software program for directing the processor to:
  obtain a first plurality of feature responses corresponding to point data in a first channel and a second plurality of feature responses corresponding to point data in a second channel, each feature response of the first and second plurality of feature responses comprising a temporal position value that indicates a temporal position in the video data, a spatial position value that indicates a spatial position of at least one object among the plurality of objects at the temporal position value, and a response value derived at a node in a predetermined layer of the artificial neural network, the first and second plurality of feature responses relating to the plurality of objects in the scene of the video data and having associated temporal and spatial position values;
  generate a third plurality of feature responses comprising a temporal position value that indicates a temporal position in the video data, a spatial position value that indicates a spatial position of at least one object among the plurality of objects at the temporal position value, and a response value derived at a node in a layer subsequent to the predetermined layer of the artificial neural network, each of the third plurality of feature responses being generated based on calculation in the layer subsequent to the predetermined layer of the artificial neural network, the calculation being performed using one of the first plurality of feature responses from the first channel, inputted to the layer subsequent to the predetermined layer of the artificial neural network, and one of the second plurality of feature responses from the second channel, inputted to the layer subsequent to the predetermined layer of the artificial neural network, and a weighted combination of associated temporal and spatial position values which correspond to one of the received first and second plurality of feature responses; and classifying an action or event relating to the plurality of objects in the scene using the artificial neural network based on the generated third plurality of feature responses.

* * * * *